(12) United States Patent
Wentworth et al.

(10) Patent No.: US 8,082,618 B2
(45) Date of Patent: Dec. 27, 2011

(54) CAR WASH CLOTH ROLL ASSEMBLY

(75) Inventors: Robert J. Wentworth, Farmington Hills, MI (US); Lionel Belanger, Northville, MI (US)

(73) Assignee: Motor City Wash Works, Inc., Northville, MI (US)

( * ) Notice: Subject to any disclaimer, the term of this patent is extended or adjusted under 35 U.S.C. 154(b) by 982 days.

(21) Appl. No.: 12/033,080

(22) Filed: Feb. 19, 2008

(65) Prior Publication Data

US 2009/0205150 A1 Aug. 20, 2009

(51) Int. Cl.
*B60S 3/06* (2006.01)
(52) U.S. Cl. ............... 15/97.3; 15/230; 15/230.14
(58) Field of Classification Search ............ 15/97.3, 15/230, 230.14
See application file for complete search history.

(56) References Cited

U.S. PATENT DOCUMENTS

| | | | | |
|---|---|---|---|---|
| 1,922,108 A | * | 8/1933 | Myers et al. | 15/230.1 |
| 2,522,092 A | * | 9/1950 | Churchill | 15/230.14 |
| 2,936,553 A | * | 5/1960 | Jones | 15/230 |
| 4,250,591 A | | 2/1981 | Mello | |
| 4,611,359 A | | 9/1986 | Bivens | |
| 4,967,440 A | * | 11/1990 | Belanger | 15/230.14 |
| 4,969,272 A | | 11/1990 | Schleeter et al. | |
| 5,127,123 A | | 7/1992 | Belanger | |
| 5,765,256 A | | 6/1998 | Allan et al. | |
| 5,813,728 A | | 9/1998 | Zigerlig | |
| 5,946,761 A | | 9/1999 | Ennis | |
| 6,035,482 A | | 3/2000 | Belanger et al. | |
| 6,182,464 B1 | | 2/2001 | Mamich | |
| 6,205,609 B1 | | 3/2001 | Sajakorpi et al. | |
| 6,287,388 B1 | | 9/2001 | Hahn | |
| 6,295,687 B1 | | 10/2001 | Dehart | |
| 6,547,655 B1 | | 4/2003 | Schaffner | |
| 7,160,183 B2 | | 1/2007 | Weber | |
| 7,219,385 B1 | | 5/2007 | Rietsch, Jr. | |
| 7,296,320 B2 | | 11/2007 | Cronin | |

* cited by examiner

*Primary Examiner* — Randall Chin
(74) *Attorney, Agent, or Firm* — Dickinson Wright PLLC

(57) ABSTRACT

A cloth-type vehicle laundering implement includes a support mechanism consisting of a rotatable drive shaft and a plurality of generally parallel, adjacently arranged spacers mounted on the support mechanism. Each of the plurality of spacers includes a first face and a second face. The implement includes a plurality of individual circular fabric disk elements disposed between the first face of one of the plurality of spacers and the second face of another of the plurality of spacers. Each of the plurality of individual circular fabric disk elements extends outwardly beyond the spacers. Each of the individual circular fabric disk elements consists of a single piece of non-woven material having an inner diameter and an outer diameter. The inner diameter is retained in a single plane by a securing mechanism such that more material is located adjacent the inner diameter than the outer diameter to provide a more rigid element. The outer diameter and the inner diameter consist of substantially the same linear length of material.

5 Claims, 2 Drawing Sheets

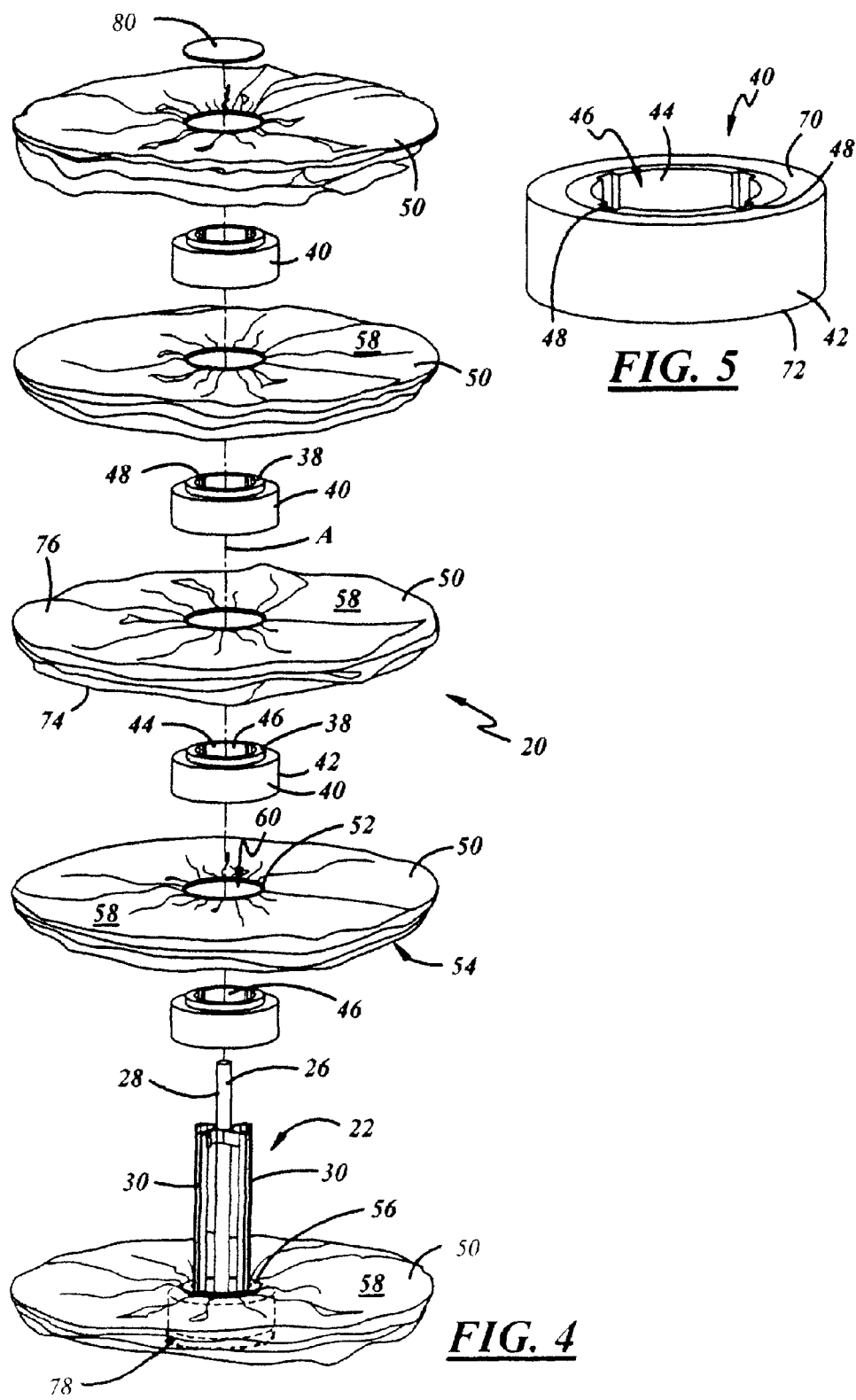

CAR WASH CLOTH ROLL ASSEMBLY

BACKGROUND OF THE INVENTION

1. Field of the Invention

The present invention relates generally to a car wash roll assembly for laundering a vehicle as it proceeds along a predetermined direction of travel. More specifically, the present invention relates to a car wash cloth roll assembly having a one-piece media that is quieter and has increased rigidity.

2. Description of the Prior Art

It is well-known in the buffing industry to use power-driven rotating implements, typically called "buffs", to polish, cut or clean a variety of different surfaces, such as metal surfaces or jewelry. For example, buffs can have a finishing media that is abrasive for sanding or cutting purposes. Additionally, buffs can have a finishing media that is soft for polishing purposes.

In the car wash industry, cloth rolls or brushes are also well known to wash or clean the exterior surfaces of automotive vehicles in an automatic or semi-automatic vehicle wash facility. These cloths rolls are used to wash or clean the sides and end surfaces of a vehicle, as well as horizontal surfaces, windows, and wheels. The cloth rolls are power driven rotating implements.

These cloth rolls that are utilized in the vehicle wash industry are often assembled using long strips of fabric such as synthetic felt; i.e. a non-woven needle-punched material. Such implements, although they perform well as far as the basic washing and/or cleaning functions are concerned, are noisy as a result of the slapping action of the individual strips or strands against the exterior surfaces of the vehicle as they rotate. Felt strips are also quite limp and do not fill out the full radial profile of a vertical axis brush unless rotated at fairly high speed. Further, increasing the speed only serves to heighten the noise.

Other cloth rolls have been utilized in the vehicle wash industry that are designed to minimize the slapping action. These cloth rolls are formed of a plurality of pieces of material that are sewn together to form a unitary cloth roll or wheel. However, the formation of these cloth rolls is extremely labor intensive and time consuming. Moreover, they can come apart along the seams where they have been sewn.

It would therefore be desirable to provide a cloth roll or wheel for use in a vehicle wash process that overcomes the disadvantages that exist with current cloth wheels.

SUMMARY OF THE INVENTION AND ADVANTAGES

It is an advantage of the present invention to provide a cloth wheel for a vehicle cleaning or washing process that is less expensive to manufacture than prior cloth wheels currently used in vehicle washing processes.

It is another advantage of the present invention to provide a cloth wheel for a vehicle cleaning or washing process that is quieter in operation than current cloth wheels employed in existing vehicle washing processes.

It is still another advantage of the present invention to provide a cloth wheel for a vehicle cleaning or washing process that has more rigidity throughout its surface area than current cloth wheels.

It is yet another advantage of the present invention to provide a cloth wheel for a vehicle cleaning or washing process that has a higher density of material adjacent the inner periphery of the rolls than adjacent the outer periphery of the rolls.

It is a further advantage of the present invention to provide a cloth wheel for a vehicle cleaning or washing process where the finishing media is constructed of a single unitary piece.

It is still a further advantage of the present invention to provide a cloth wheel for a vehicle cleaning or washing process that is constructed to reduce weight.

It is yet a further advantage of the present invention to provide a method for forming a cloth wheel that yield these advantages.

In accordance with the above and the other advantages of the present invention, a cloth-type vehicle laundering assembly for use in a vehicle washing process is provided. The assembly includes a support mechanism consisting of a rotatable drive shaft. A plurality of generally parallel, adjacently arranged spacers are mounted on the support mechanism. Each spacer has a first face and a second face. The assembly also includes a plurality of individual circular fabric disk elements disposed between the first face of one of the plurality of spacers and the second face of another of the plurality of spacers. Each of the plurality of individual circular fabric disk elements extends outwardly beyond the spacers. Each of the individual circular fabric disk elements consists of a single piece of non-woven material having an inner diameter and an outer diameter. The inner diameter is retained by a securing mechanism such that more material is located adjacent the inner diameter than the outer diameter to provide a more rigid element. The outer diameter and the inner diameter consist of substantially the same linear length of material.

These and other features and advantages of the present invention will become apparent to one of ordinary skill in the art from the following description of the invention, when viewed in accordance with the accompanying drawings and appended claims.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 4 is an exploded view of a cloth roll or wheel in accordance with one embodiment of the present invention; and FIG. 5 is a perspective view of a spacer element in accordance with another embodiment of the present invention.

DETAILED DESCRIPTION OF THE INVENTION

Figure 1:
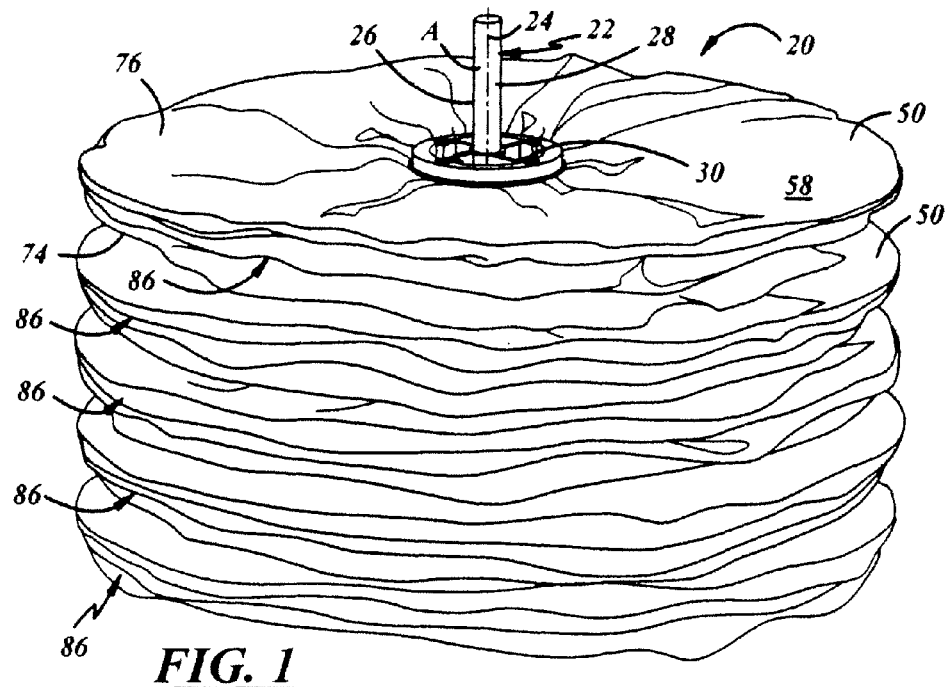
FIG. 1 is perspective view of a plurality of individual cloth disk segments assembled together to form a cloth roll or wheel in accordance with one embodiment of the present invention.

Referring to the Figures, a car wash roll assembly 20 is provided. The car wash roll assembly is part of a vehicle washing system, as will be understood by one of ordinary skill in the art. In the embodiments shown and described, the car wash roll assembly 20 is intended to contact side surfaces of a vehicle, such as doors, side panels, and windows, to effectuate cleaning thereof. In this configuration, the roll assembly is mounted to the ground and has a vertical axis of rotation. However, it will be understood by one of ordinary skill in the art that the car wash roll assembly 20 can be configured to contact other exterior surfaces of the vehicle other than or in addition to the side surfaces of the vehicle. For example, the assembly 20 can be mounted to have a horizontal axis of rotation and contact an upper exterior surface of the vehicle. The car wash roll assembly 20 is preferably incorporated into a vehicle washing system where the vehicle moves with respect to the assembly. However, it will be understood that the assembly may also be incorporated into a system where the vehicle is stationary and the car wash roll assembly moves with respect to the vehicle.

Referring to the Figures, wherein like numerals indicate corresponding parts throughout the several views, a car wash roll assembly 20 is generally shown for laundering a vehicle as it proceeds along a predetermined direction of travel in a vehicle cleaning system.

The assembly 20 includes a drive shaft assembly 22 having a pair of opposing ends 24. The drive shaft assembly 22 extends longitudinally along an axis of rotation A. The axis of rotation A is typically perpendicular or parallel to the predetermined direction of travel of the vehicle, but may be at any angle to the predetermined direction of travel. The drive shaft assembly 22 includes a rotary shaft 26 that is generally cylindrical and has a shaft periphery 28. While the rotary shaft 26 here is generally cylindrical, it may be any shape known in the art. The drive shaft assembly 22 is in communication with an actuator, such as a motor, to effectuate rotation thereof. The motor is in communication with a controller, which determines when to actuate the assembly, for how long, and at what speed.

In accordance with one embodiment, the shaft periphery 28 has a plurality of protrusions 30 that extend outwardly from the rotary shaft 26. The plurality of protrusions 30 are preferably uniformly spaced about the shaft periphery 28. The embodiments shown preferably include four protrusions. However, more or less protrusions may be utilized and their shape, configuration and location may vary as desired. The protrusions 30 are intended to assist in driving the assembly 20. It will be understood by one of ordinary skill in the art that a variety of other suitable ways for driving the assembly 20 may be employed.

Figure 2:
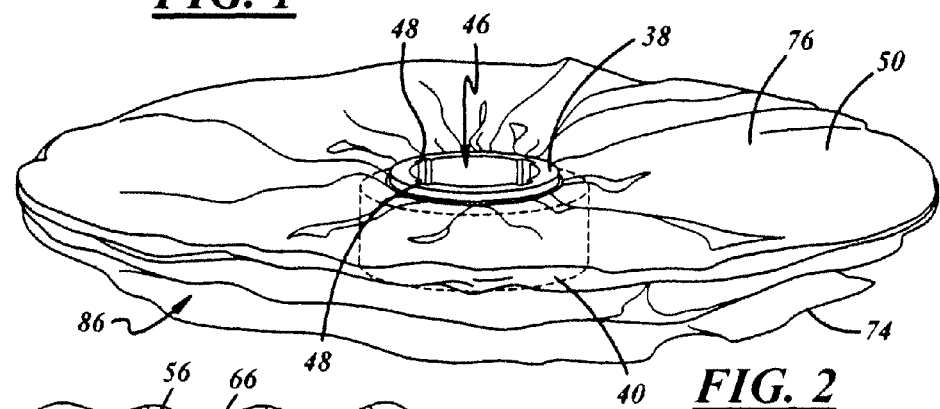
FIG. 2 is perspective view of an individual cloth disk segment engaged with a spacer in accordance with one embodiment of the present invention.
Figure 3:
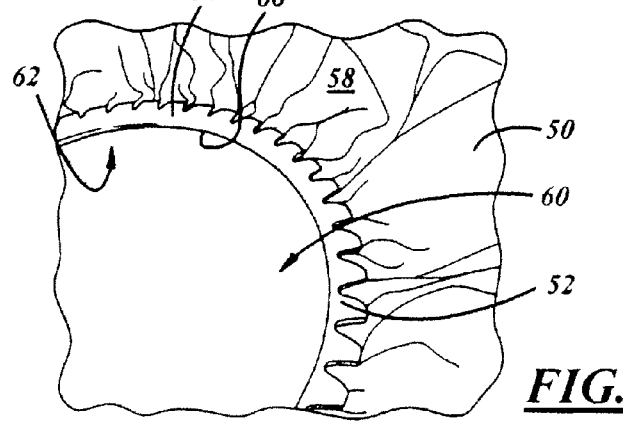
FIG. 3 is a schematic illustration of a securing mechanism for retaining an inner diameter of an individual cloth disk segment in accordance with one embodiment of the present invention.

As shown in FIGS. 1, 2, and 4, the assembly 20 includes a plurality of spacers 40. Each of the plurality of spacers 40 has an outer periphery 42 and in inner periphery 44 defining a spacer opening 46. The spacer opening 46 allows the spacers 40 to be located on the drive shaft assembly 20. The spacers 40 are cylindrical and have a spacer diameter ($d_{sp}$). The spacers 40 may include a spacer shoulder 38 having a shoulder diameter ($d_{sh}$) less than the spacer diameter ($d_{sp}$). The spacer opening 46 is generally circular and preferably includes a plurality of notches 48 formed in the inner periphery 44. The plurality of notches 48 are sized and shaped to match the size and shape of the protrusions 30 formed on the shaft periphery 28. Additionally, the number of notches 48 should match the number of protrusions 30.

The notches 48 extend parallel to the axis of rotation A to mate with each of the protrusions 30. This engagement between the protrusions 30 and the notches 48 secures the plurality of spacers 40 to the drive shaft assembly 22 such that, as the drive shaft assembly 22 rotates, the spacers 40 rotate therewith. The inclusion of the spacer shoulder 38 in this embodiment also assists in coupling the drive shaft assembly 22 to the spacers 40. The spacers 40 can be formed from a variety of suitable materials, such as rubber, foam, or plastic. In the embodiment where the spacers 40 are plastic, they are preferably hollow to minimize weight.

As shown, a plurality of cloth disks 50 are disposed on the drive shaft assembly 22. Each of the plurality of cloth disks 50 is individually removable from the drive shaft assembly 22. The cloth disks 50 include at least one non-woven material sheet having an inner edge 52 and an outer edge 54. Preferably, the cloth disks 50 are formed of a single sheet or piece of non-woven material. In a preferred embodiment, the non-woven material sheet is a spun bond material. However, other suitable non-woven materials may also be utilized. The inner edge 52 and the outer edge 54 have substantially the same linear length of material.

During formation, as discussed in more detail below, the inner edge 52 of material is bunched adjacent the center 60 of the cloth disk 50 to create an inner diameter ($d_i$) or circumference that is retained in a single plane. A clinch ring 56 that is circular secures the inner edge 52 of material and creates a non-pleated finishing surface 58 with the outer edge 54 of material. While the finishing surface 58 is not flat, the material bunches up and is not pleated. The finishing surface 58 engages the vehicle proceeding along the predetermined direction of travel. The clinch ring 56 includes a ring opening 62 that is circular and has a ring opening diameter ($d_r$) that is less than the spacer diameter ($d_{sp}$). While the securing mechanism preferably binds the inner diameter in a single plane, it will be understood that the securing mechanism can take on a variety of non-planar shapes. Indeed, such a configuration may assist in interlocking the components that form the assembly.

With reference to FIGS. 2 and 4, the clinch ring 56 mates with the spacer shoulder 38, and each of the cloth disks 50 are disposed between two of the spacers 40. As shown, the spacer shoulder 38 has a smaller diameter ($d_{sh}$) than the ring opening diameter ($d_r$). This relationship allows the spacer shoulder 38 to pass through the spacer opening 46. The outer periphery 42 of the spacer shoulder 38 preferably has a diameter that is slightly less than the diameter ($d_r$) of the ring opening 62. With this configuration, the spacer shoulder 38 preferably abuts the inner surface 66 of the clinch ring 56 and a top surface 70 of the spacer 40 engages an under surface of the clinch ring 56. Additionally, the clinch ring 56 is eco treated to prevent corrosion of the clinch ring 56. Other anti-corrosive treatments may alternatively be employed.

FIG. 5 illustrates another embodiment of a spacer 40. In this embodiment, the spacer 40 has a top surface 70 and a bottom surface 72. The top surface 70 is intended to engage a lower side 74 of a cloth disk 50 and the bottom surface 72 is intended to engage an upper side 76 of an adjacent cloth disk 50. In this embodiment, the spacer 40 does not have a spacer shoulder. Again, the spacer 40 of this embodiment, can be constructed of any suitable material as discussed above. It will also be understood that the top and bottom surfaces 70, 72 of the spacer 40 can be configured in a non-planar fashion so as to match the shape of a non-planar securing mechanism, as discussed above, and create an interlocking fit.

With reference to FIGS. 1 and 4, the steps to assemble the car wash roll assembly 20 are discussed in more detail. First, a bottom cap 78 or plate is secured to the drive shaft assembly 22. Next, a spacer 40 is disposed on the drive shaft assembly by placing the spacer opening 46 over the rotary shaft 26. The spacer 40 is aligned such that the notches 48 of the spacer 40 are aligned with and engage the protrusions 30 in the outer periphery 28 of the rotary shaft 26. A cloth disk 50 is then disposed on the rotary shaft 26 by placing the clinch ring opening 62 over the rotary shaft 26. The lower side 74 of the cloth disk 50 engages the top surface 70 of the spacer 40. In the embodiment where the spacer 40 includes the spacer shoulder 38, the spacer shoulder 38 fits within the clinch ring opening 62. Thereafter, another spacer 40 is placed onto the rotary shaft 26 in the same manner discussed above such that the bottom surface 72 engages the upper side of the cloth disk 50. Another cloth disk 50 is then placed onto the rotary shaft 26 in the same manner discussed above such that the lower side 74 of the cloth disk 50 engages the top surface 70 of the spacer 40. This process continues with alternating spacers 40 and cloth disks 50 being placed on the rotary shaft 26 until the appropriate number is disposed thereon. Finally, a top cap 80 is assembled onto the rotary shaft to secure the components in place. It will be appreciated that other assembly steps may also be employed and other structures may also be utilized to form the assembly 20.

It will be understood that more than one spacer 40 can be disposed between the disks 50 as desired to provide more spacing between the disks. Alternatively, more spacers 40 can be disposed on the rotary shaft 26 adjacent either the bottom cap 78 or the top cap 80. It will also be understood that the terms "top", "bottom", "upper", and "lower" are used herein for illustrative and reference purposes only and are not intended to be limiting. For example, while the attachment of the bottom cap 78 is discussed initially, it will be appreciated that the top cap 80 could alternately be attached to the shaft first.

The caps 78, 80 are secured to the drive shaft assembly 22 at each of the ends 24 to apply sufficient pressure to the spacers 40. This pressure creates friction between each of the cloth disks 50 and the spacers 40 to sandwich and secure each of the cloth disks 50 between a pair of adjacent spacers 40. As such, the plurality of spacers 40 and the plurality of cloth disks 50 can be rotated as a unit limiting relative movement therewith. By this configuration, the cloth disks 50 do not need to engage the rotary shaft 26. Instead, the pressure applied to each side 74, 76 of the cloth disk 50 creates sufficient friction such that as the rotary shaft 26 turns, it rotates the spacers 40 due to their mechanical engagement, which in turn rotates the cloth disks 50. Sufficient pressure is applied to the cloth disks 50 to prevent relative movement of the cloth disks 50 with respect to the spacers 40.

An actuator (not shown) is in communication with the drive shaft assembly 22 to effectuate rotation about the axis of rotation A as commanded. The actuator (not shown) in communication with the drive shaft assembly 22 rotates it such that each of a plurality of individual cloth disk 50 rotates to contact an exterior surface of the vehicle.

With reference to the Figures, the method of forming each of the cloth disks is discussed with reference to the method of forming one of the cloth disks 50. The method for forming each of the cloth disks 50 is the same. In accordance with a preferred embodiment, a single unitary piece of non-woven material is laid out flat on a surface. The length of the piece of material depends upon the number of wraps desired. The piece or sheet of material is then wrapped around a cylindrical surface, such as a drum, which generally matches the desired outer diameter of the cloth disk. In a preferred embodiment, two drums are used that have a space therebetween. Preferably, the sheet is long enough such that it wraps around the cylindrical surface about one and a half times. However, any suitable length of material may be utilized.

The sheet of material is then grasped in the space between the drums to bring it together. This brings the outer ends toward the center. The sheet at this point has an outer diameter formed by the ends and an inner diameter formed where the sheet was grasped or clamped. The inner diameter and the outer diameter have the same linear length.

As shown in the drawings, with this method, the material bunches up adjacent the inner periphery such that more material per linear inch is located in the area near the inner periphery than the outer periphery. The bunching is random and not pleated—unlike other known vehicle washing disks. Additionally, the material is more dense near the inner periphery than the outer periphery and the inner and outer peripheries have the same linear length of material. In other words, the inner periphery has substantially the same linear dimension as the outer periphery. This increased density around or near the inner periphery helps the cloth disk retain its shape (i.e. not sag) and thus provides a larger effective outer diameter. This allows the disks to be spaced further apart on the rotary shaft 26. The inner periphery defines an opening to be placed over the rotary shaft 26. Once the sheet has been configured in the proper shape, a clinch ring 56 is utilized to clamp the inner periphery and secure the sheet of material in the shape of a circular disk having multiple layers 86, as shown in FIGS. 1 and 2.

While the outer periphery of the disk preferably matches the outer diameter of the drum, it will be understood that the outer diameter may vary. For example, instead of grasping the sheet of material that has been wrapped around the drums at the center, the sheet could be grasped nearer one of the ends or edges. This will result in more material being located on one side of the grasp thereby yielding a disk having a larger diameter on one side of the securing mechanism and a smaller diameter on the other side of the securing mechanism.

The cloth disk 50 is thus formed from a single unitary piece of material that does not require stitching or sewing and does not have seams that can come apart. The manufacture of the disk is easier and less expensive than prior cloth disks used in the vehicle washing industry. The cloth disk is also lighter in weight and quieter because it is formed of a single piece instead of a plurality of separate fingers.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A car wash roll assembly for laundering a vehicle in a vehicle cleaning process as the vehicle proceeds along a predetermined direction of travel, comprising:

a drive shaft assembly having a pair of opposing ends and having a longitudinally extending axis of rotation, said drive shaft assembly having a plurality of protrusions uniformly spaced about a shaft periphery of said drive shaft assembly;

an actuator in communication with said drive shaft assembly to effectuate rotation about said axis of rotation as commanded;

a plurality of spacers having a spacer opening, said spacer opening having a plurality of mating notches for engagement with a respective one of said plurality of protrusions on said shaft periphery to effectuate rotation of said plurality of spacers as said drive shaft assembly rotates;

a plurality of cloth rolls consisting of a single sheet of non-woven material having an inner edge secured by a clinch ring to create a non-pleated finishing surface for engaging the vehicle as it proceeds along the horizontal path of travel, each of said plurality of cloth rolls being disposed between two of said plurality of spacers; and a cap secured to said drive shaft at one of said ends for applying sufficient pressure to said spacers to create friction between each of said cloth rolls and said spacers to sandwich and secure each of said cloth rolls between a pair of adjacent spacers such that said plurality of spacers and said plurality of cloth rolls can be rotated as a unit without relative movement therebetween.

2. The assembly of claim 1, wherein said axis of rotation is perpendicular to the path of travel of the automobile.

3. The assembly of claim 1, wherein said clinch ring is eco treated for preventing corrosion of said clinch ring.

4. The assembly of claim 1, wherein said non-woven material sheet is a spun bond material.

5. The assembly of claim 1, wherein each of said plurality of spacers includes an upwardly extending shoulder for engagement with an inner periphery of said clinch ring of said cloth roll to secure said cloth roll to said spacer to be rotated therewith.

* * * * *